United States Patent
Choi et al.

(10) Patent No.: US 12,487,731 B2
(45) Date of Patent: Dec. 2, 2025

(54) METHOD FOR EXECUTING AND CANCELLING FUNCTION BY USING FLEXIBLE UI AND USER RESPONSE IN PROCESS OF AUTOMATICALLY EXECUTING FUNCTION, AND DEVICE THEREOF

(71) Applicant: Samsung Electronics Co., Ltd., Suwon-si (KR)

(72) Inventors: Seunghwan Choi, Suwon-si (KR); Yoonsu Kim, Suwon-si (KR); Soonkyu Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/741,156

(22) Filed: Jun. 12, 2024

(65) Prior Publication Data
US 2024/0329814 A1 Oct. 3, 2024

Related U.S. Application Data

(63) Continuation of application No. PCT/KR2022/016274, filed on Oct. 24, 2022.

(30) Foreign Application Priority Data

Dec. 13, 2021 (KR) .................. 10-2021-0178077
Dec. 29, 2021 (KR) .................. 10-2021-0191151

(51) Int. Cl.
G06F 3/0484 (2022.01)
G06F 3/01 (2006.01)
G06F 3/16 (2006.01)

(52) U.S. Cl.
CPC ............ *G06F 3/0484* (2013.01); *G06F 3/013* (2013.01); *G06F 3/017* (2013.01); *G06F 3/167* (2013.01)

(58) Field of Classification Search
CPC ........ G06F 3/0484; G06F 3/013; G06F 3/017; G06F 3/167; G06F 2203/0381;
(Continued)

(56) References Cited

U.S. PATENT DOCUMENTS

2004/0098462 A1 5/2004 Horvitz et al.
2015/0177843 A1 6/2015 Kwon
(Continued)

FOREIGN PATENT DOCUMENTS

CN 111459285 A 7/2020
KR 10-2006-0024376 A 3/2006
(Continued)

OTHER PUBLICATIONS

International Search Report dated Feb. 6, 2023, issued in International Patent Application No. PCT/KR2022/016274.

*Primary Examiner* — Premal R Patel
(74) *Attorney, Agent, or Firm* — Jefferson IP Law, LLP

(57) ABSTRACT

An electronic device is provided. The electronic device includes a display, memory, including one or more storage media, storing instructions, and one or more processors communicatively coupled to the display and the memory, wherein the instructions, when executed by the one or more processors, cause the electronic device to detect a first event while a first screen is displayed, display a first user interface including information related to a first function corresponding to the first event on a portion of the first screen, identify a direction of a gaze of a user, while the first user interface is displayed, display a second user interface, based on the direction of the gaze corresponding to a location of the first user interface, and determine whether to execute the first function corresponding to the first event, based on a first user input detected while the second user interface is displayed.

21 Claims, 15 Drawing Sheets

(58) Field of Classification Search
CPC . G06F 3/0481; G06F 3/01; G06F 3/16; G06F 9/451
See application file for complete search history.

(56) References Cited

U.S. PATENT DOCUMENTS

| | | | |
|---|---|---|---|
| 2016/0098093 A1* | 4/2016 | Cheon | H04N 21/41265 345/156 |
| 2019/0025910 A1 | 1/2019 | Gilra | |
| 2019/0265946 A1 | 8/2019 | Bae et al. | |
| 2019/0370526 A1 | 12/2019 | Wang et al. | |
| 2020/0249750 A1 | 8/2020 | Choi et al. | |
| 2020/0341546 A1 | 10/2020 | Yuan et al. | |
| 2021/0181858 A1 | 6/2021 | Okuley | |
| 2021/0325960 A1 | 10/2021 | Iglesias et al. | |

FOREIGN PATENT DOCUMENTS

| | | |
|---|---|---|
| KR | 10-2014-0039961 A | 4/2014 |
| KR | 10-2015-0073378 A | 7/2015 |
| KR | 10-2016-0039499 A | 4/2016 |
| KR | 10-2019-0038003 A | 4/2019 |
| KR | 10-2020-0012694 A | 2/2020 |
| KR | 10-2021-0002697 A | 1/2021 |
| KR | 10-2236292 B1 | 4/2021 |
| KR | 10-2337682 B1 | 12/2021 |

* cited by examiner

METHOD FOR EXECUTING AND CANCELLING FUNCTION BY USING FLEXIBLE UI AND USER RESPONSE IN PROCESS OF AUTOMATICALLY EXECUTING FUNCTION, AND DEVICE THEREOF

CROSS-REFERENCE TO RELATED APPLICATION(S)

This application is a continuation application, claiming priority under § 365(c), of an International application No. PCT/KR2022/016274, filed on Oct. 24, 2022, which is based on and claims the benefit of a Korean patent application number 10-2021-0178077, filed on Dec. 13, 2021, in the Korean Intellectual Property Office, and of a Korean patent application number 10-2021-0191151, filed on Dec. 29, 2021, in the Korean Intellectual Property Office, the disclosure of each of which is incorporated by reference herein in its entirety.

BACKGROUND

1. Field

The disclosure relates to a method and apparatus for executing and canceling a function by using a variable user interface (UI) and a user response in an automatic function execution process.

2. Description of Related Art

A variety of user inputs are used to operate an electronic device (e.g., a mobile device, a television (TV), or a tablet). For example, a gesture input using a part of a user's body, a gaze input using a user's eyes, a voice input using a user's voice, or a user input using an external device (e.g., a remote control) is used.

The electronic device (e.g., a mobile device, a TV, or a tablet) may execute a certain function (e.g., screen brightness adjustment, viewing channel switching, changing of an audio output method, or video call reception) according to a user input. Alternatively, the electronic device may execute a specified function in response to detection of a specified event, even in the absence of a user input. The function of executing a specified function in response to detection of a specified event in an electronic device may be referred to as an intelligence function (or an automatic execution function). Because the electronic device performs the intelligence function without user intervention, there is an issue that it may be performed against a user's will.

The above information is presented as background information only to assist with an understanding of the disclosure. No determination has been made, and no assertion is made, as to whether any of the above might be applicable as prior art with regard to the disclosure.

SUMMARY

Regarding the intelligence function in the electronic device, when a function is executed against the user's will, the user may feel uncomfortable in using the electronic device, and furthermore, unnecessary power may be consumed in the process of executing the function that the user does not want and canceling the automatically executed function again by the user.

Execution of a function against a user's will may be prevented or reduced and thus power waste may be minimized in performing an intelligence function in an electronic device.

Aspects of the disclosure are to address at least the above-mentioned problems and/or disadvantages and to provide at least the advantages described below. Accordingly, an aspect of the disclosure is to provide a method and an apparatus for executing and canceling a function by using a variable user interface (UI) and a user response in an automatic function execution process.

Additional aspects will be set forth in part in the description which follows and, in part, will be apparent from the description, or may be learned by practice of the presented embodiments.

In accordance with an aspect of the disclosure, an electronic device is provided. The electronic device includes a display, memory storing one or more computer programs, and one or more processors communicatively coupled to the display and the memory, wherein the computer programs include computer-executable instructions that, when executed by the one or more processors, cause the electronic device to detect a first event, while a first screen is displayed through the display, display a first user interface including information related to a first function corresponding to the first event on at least a portion of the first screen through the display, based on the detection of the first event, identify a direction of a gaze of a user of the electronic device, while the first user interface is displayed, display a second user interface, based at least in part on the direction of the gaze corresponding to a location where the first user interface is displayed, and determine whether to execute the first function corresponding to the first event, based on a first user input detected while the second user interface is displayed.

In accordance with another aspect of the disclosure, a method of operating an electronic device is provided. The method includes detecting a first event, while a first screen is displayed through a display of the electronic device, displaying a first user interface including information related to a first function corresponding to the first event on at least a portion of the first screen through the display, based on the detection of the first event, identifying a direction of a gaze of a user of the electronic device, while the first user interface is displayed, displaying a second user interface, based at least in part on the direction of the gaze corresponding to a location where the first user interface is displayed, and determining whether to execute the first function corresponding to the first event, based on a first user input detected while the second user interface is displayed.

In accordance with another aspect of the disclosure, one or more non-transitory computer-readable storage media storing computer-executable instructions that, when executed by one or more processors of an electronic device, cause the electronic device to perform operations are provided. The operations include detecting a first event, while a first screen is displayed through a display of the electronic device, displaying a first user interface including information related to a first function corresponding to the first event on at least a portion of the first screen through the display, based on the detection of the first event, identifying a direction of a gaze of a user of the electronic device, while the first user interface is displayed, displaying a second user interface, based at least in part on the direction of the gaze corresponding to a location where the first user interface is displayed, and determining whether to execute the first function corresponding to the first event, based on a first user input detected while the second user interface is displayed.

A method and apparatus for executing and canceling a function by using a variable user interface (UI) and a user response in an automatic function execution process according to various embodiments may provide a method of automatically executing a function or discontinuing the automatically executed function according to a user response (or intervention), and further provide a method of canceling an automatically executed function. Accordingly, power waste may be prevented in performing an intelligence function in an electronic device.

The settings of the intelligence function according to a user's usage history may be changed and thus a user-customized algorithm may be optimized, by providing method and apparatus for executing and canceling a function by using a variable UI and a user response in an automatic function execution process according to various embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
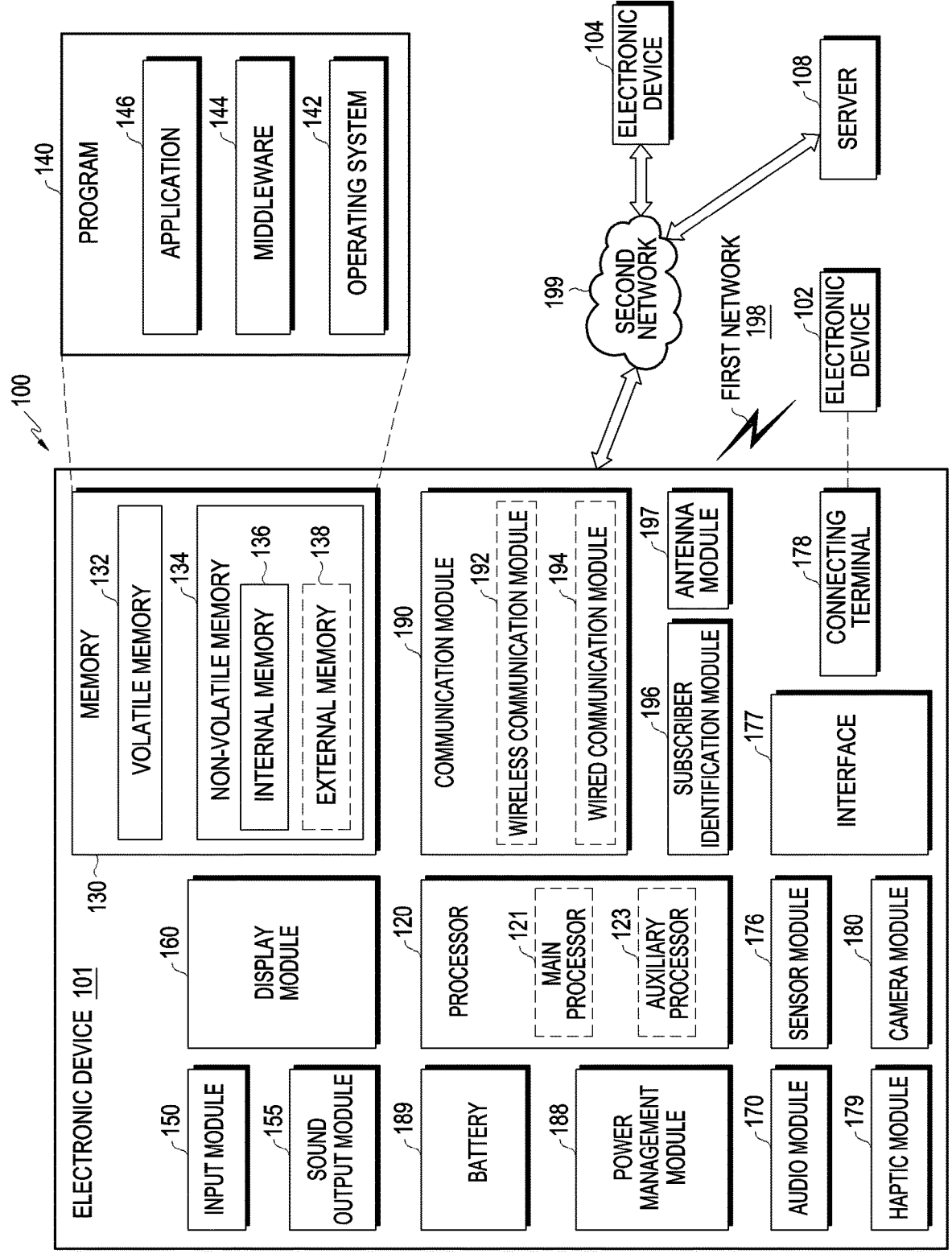
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the strength of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). according to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form an mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a specified high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the specified high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
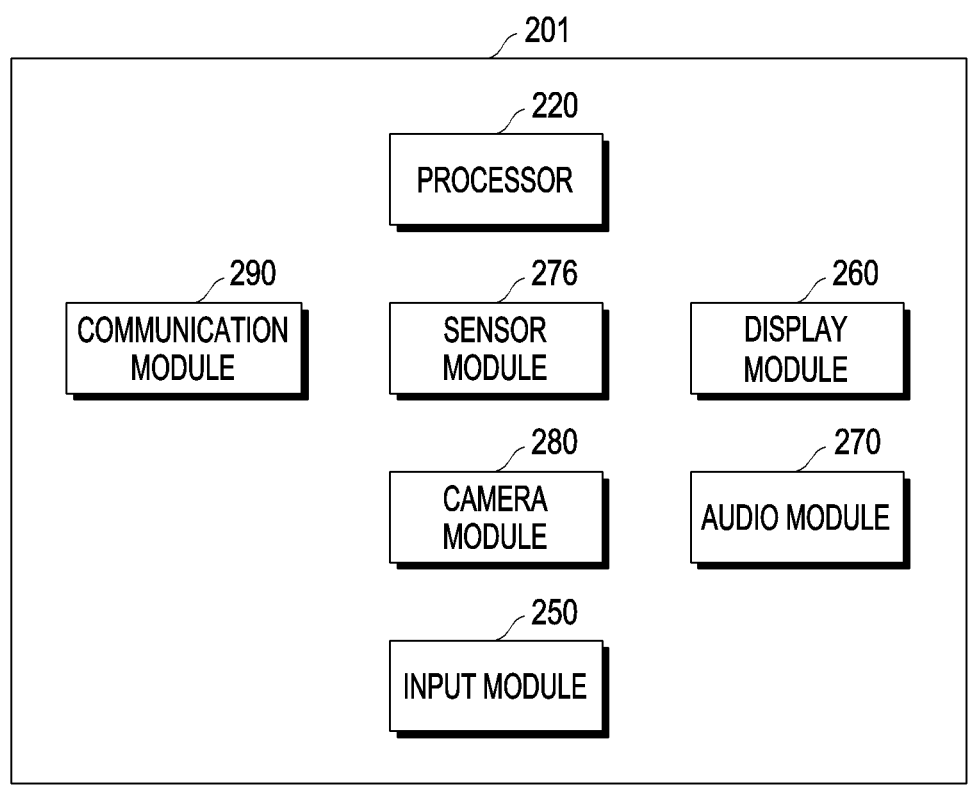
FIG. 2 is a block diagram illustrating an electronic device according to an embodiment of the disclosure.

FIG. 2 is a block diagram illustrating an electronic device according to an embodiment of the disclosure.

An electronic device 201 in FIG. 2 may be the electronic device 101 in FIG. 1. For example, the electronic device 201 in FIG. 2 may be a mobile device, a TV, or a tablet, and the type of the electronic device 201 is not limited.

Referring to FIG. 2, the electronic device 201 according to various embodiments may include a processor 220, a communication module 290, a sensor module 276, a camera module 280, an input module 250, a display module 260, and/or an audio module 270. Each of the components disclosed in FIG. 2 may correspond to its counterpart disclosed in FIG. 1. For example, the processor 220, the communication module 290, the sensor module 276, the camera module 280, the input module 250, the display module 260, or the audio module 270 in FIG. 2 may correspond to the processor 120, the communication module 190, the sensor module 176, the camera module 180, the input module 150, the display module 160, or the audio module 170 in FIG. 1, respectively.

According to various embodiments of the disclosure, the electronic device 201 (e.g., the processor 220 of the electronic device 201) may identify a user input (e.g., a gesture input, a voice input, or a gaze input) detected through the sensor module 276, the camera module 280, or the input module 250. For example, the gesture input may be a user input using movement of at least a part of a user's body. For example, the voice input may be a user input using the user's voice. For example, the gaze input may be a user input using the direction of a gaze of the user, the holding duration of the gaze, and/or eye movement (e.g., blinking). The types of user inputs are not limited, and the electronic device 201 may perform or limit its operation based on a user input.

According to various embodiments of the disclosure, the electronic device 201 (e.g., the processor 220 of the electronic device 201) may identify a user input from the user of the electronic device 201 by receiving information about a user input (e.g., a gesture input, a voice input, or a gaze input) detected by an external device (e.g., an external sensor module, an external camera module, or an external input module) through the communication module 290. The method of identifying a user input by the electronic device 201 is not limited.

Figure 3:
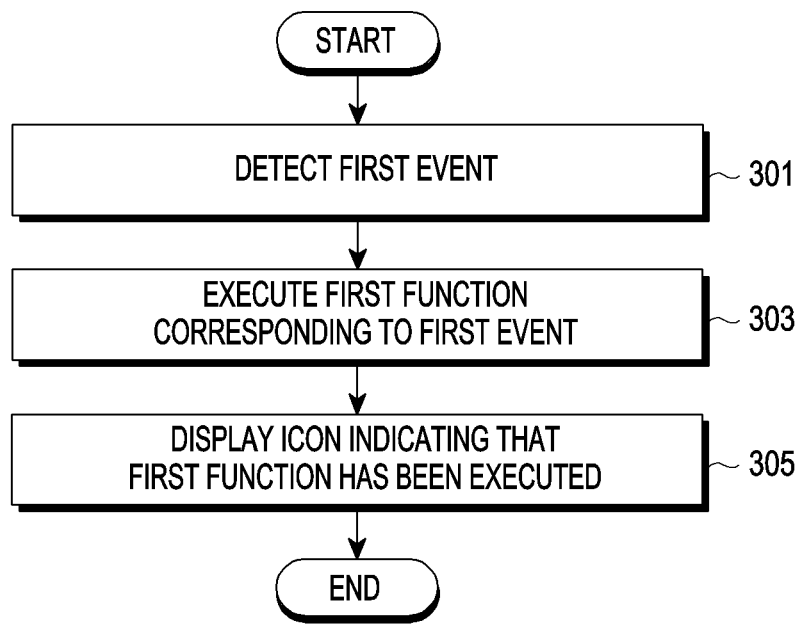
FIG. 3 is a flowchart illustrating an operation of an electronic device according to an embodiment of the disclosure.
Figure 4:
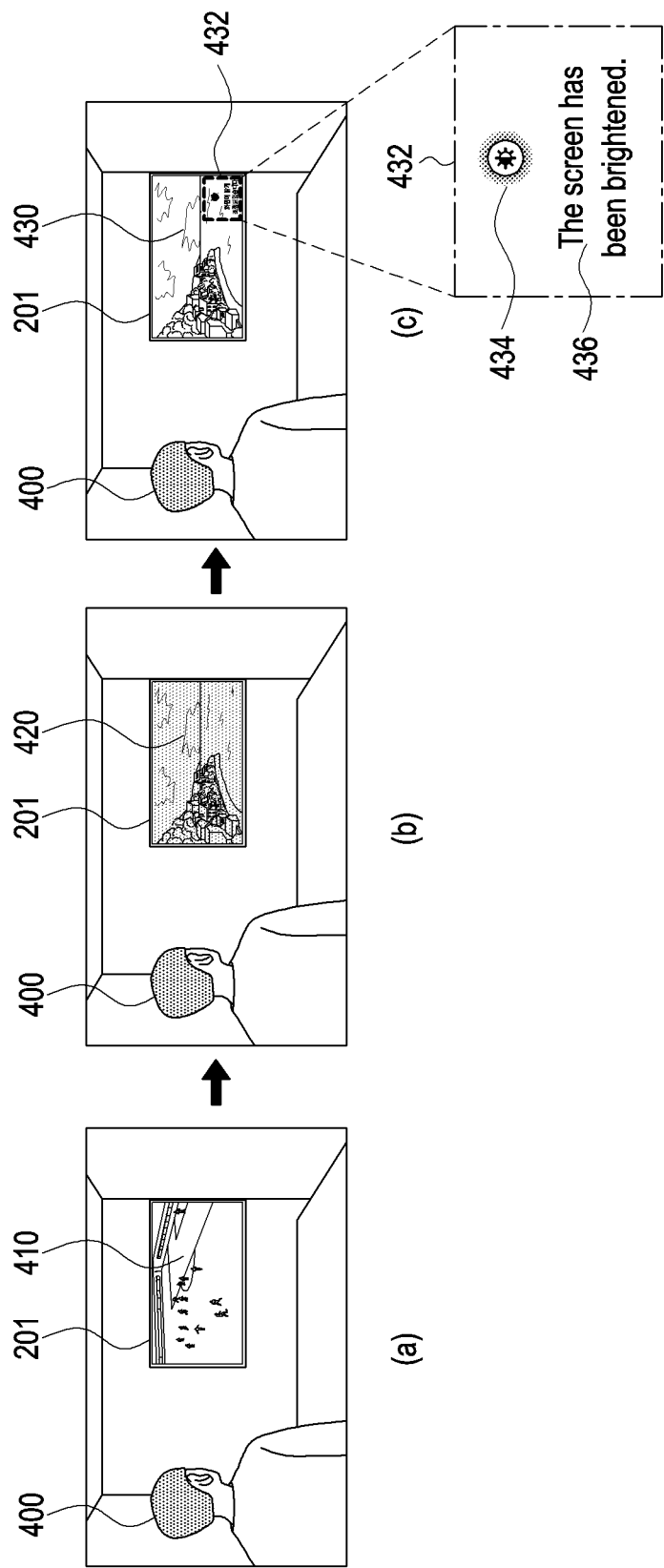
FIG. 4 is a diagram illustrating an operation of an electronic device according to an embodiment of the disclosure.

FIG. 3 is a flowchart illustrating an operation of an electronic device according to an embodiment of the disclosure. FIG. 3 will be described with reference to FIG. 4. FIG. 4 is a diagram illustrating an operation of an electronic device according to an embodiment of the disclosure.

Referring to FIG. 3, it may be understood how the electronic device 201 detects an event, executes a function (e.g., screen brightness adjustment, viewing channel switching, changing of an audio output method, or video call reception) corresponding to the detected event, and indicates that the function has been executed. Referring to FIG. 3, "automatic function execution" of the electronic device 201 may be understood. A description will be given mainly of an embodiment related to screen brightness adjustment, followed by those of various other embodiments.

Referring to FIG. 3, the electronic device 201 (e.g., the processor 220 of the electronic device 201) according to various embodiments may detect (or identify) an event (e.g., a first event) in operation 301. For example, the electronic device 201 may identify an event related to the brightness of a screen displayed on the display module 260 of the electronic device 201. For example, the electronic device 201 may identify that the screen is dark or bright. For example, the electronic device 201 may identify an event that the brightness of the screen displayed on the display module 260 falls within a specified range (e.g., a normal brightness range) or an event that the brightness of the screen does not fall within the specified range. The method of identifying whether a screen displayed on the display module 260 is dark or bright by the electronic device is not limited.

In operation 303, the electronic device 201 according to various embodiments may execute a function (e.g., a first function) corresponding to the detected event (e.g., the first event). For example, the electronic device 201 may perform screen brightness adjustment based on the brightness of the screen displayed on the display module 260. For example, the electronic device 201 may adjust the screen to be bright when the screen is dark and to be dark when the screen is bright. For example, the electronic device 201 may perform the screen brightness adjustment based on the brightness of the screen displayed on the display module 260 not falling within the specified range, such that the brightness of the screen falls within the specified range (e.g., the normal brightness range).

Referring to FIG. 4, for example, the electronic device 201 may play video content on the display module 260. In part (a) of FIG. 4, the electronic device 201 may display a first screen 410 of the video content on the display module 260. The electronic device 201 may continue to display the first screen 410 without any screen adjustment, based on the brightness of the first screen 410 falling within the normal range. Then, the electronic device 201 may display a second screen 420 of the video content. The electronic device 201 may identify that the second screen 420 is dark in part (b) of FIG. 4, and display a third screen 430 by adjusting the screen brightness based on the second screen 420 being dark in part (c) of FIG. 4. The third screen 430 may be a screen with the same content as the second screen 420, but with the adjusted brightness.

In operation 305, the electronic device 201 according to various embodiments may display an icon indicating that the function (e.g., the first function) corresponding to the detected event (e.g., the first event) has been executed. For example, the electronic device 201 may adjust the screen brightness based on the screen displayed on the display module 260 being dark, and then display an icon (e.g., 432 in FIG. 4) indicating that the screen brightness has been adjusted.

In part (c) of FIG. 4, for example, the electronic device 201 may display the icon 432 indicating that the brightness of the screen on the display module 260 has been adjusted. For example, the icon 432 may include an icon 434 (e.g., a sun-shaped icon) specified in relation to screen brightness adjustment and/or text 436 (e.g., "The screen has been brightened") indicating that the screen brightness has been adjusted. For example, the electronic device 201 may display the icon (e.g., the icon 432) indicating that the function has been executed, on at least a portion of the screen (e.g., the third screen 430) of the display module 260.

According to various embodiments of the disclosure, referring to FIG. 4, the electronic device 201 may perform the operations disclosed in FIG. 3, regardless of whether a user input from a user 400 has been detected. The electronic device 201 may display the icon 432 indicating that the specific function (e.g., the screen brightness adjustment function) has been executed in the operation 305 of FIG. 3, thereby allowing the user to recognize that the function has been executed.

According to various embodiments of the disclosure, the electronic device 201 may switch a viewing channel based on identifying an event related to a program that the user has frequently viewed or an event related to a program that the user has scheduled to view, based on a viewing history of the user. For example, a "program that was being viewed" or a "program that was scheduled to be viewed" may be video content transmitted by a broadcasting station and played on a TV, or video content received in a network environment and available for viewing on a mobile device. For example, a viewing channel may refer to a channel indicating a broadcasting station which transmits content to be played among a plurality of broadcasting stations. For example, the electronic device 201 may switch the viewing channel based on the start of a program that the user has frequency viewed or the start of a program that the user has scheduled to view. For example, the electronic device 201 may display an icon indicating switching of the viewing channel (e.g., an icon indicating that the channel will be switched or an icon indicating that the channel has been switched) on at least a portion of a screen. Likewise, embodiments related to viewing channel switching may be understood with reference to the embodiment of FIG. 3, and the embodiments of FIGS. 5 to 11, 12A, 12B, 13, and 14 which will be described later.

According to various embodiments of the disclosure, the electronic device 201 may determine a method of outputting audio of the video content based on data of the video content being played through the display module 260. For example, the electronic device 201 may determine, based on the video content being played, whether to output the audio of the video content through a speaker or through a headset. For example, the electronic device 201 may determine or change the method of outputting the audio of the video content based on identifying an event related to the play of the video content. For example, the electronic device 201 may display an icon indicating determination or change of the audio output method (e.g., an icon indicating that the audio output method will be changed, or an icon indicating that the audio output method has been changed) on at least a portion of the screen. Likewise, embodiments related to changing of an audio output method may be understood with reference to the embodiment of FIG. 3, and the embodiments of FIGS. 5 to 11, 12A, 12B, 13, and 14 which will be described later.

Figure 5:
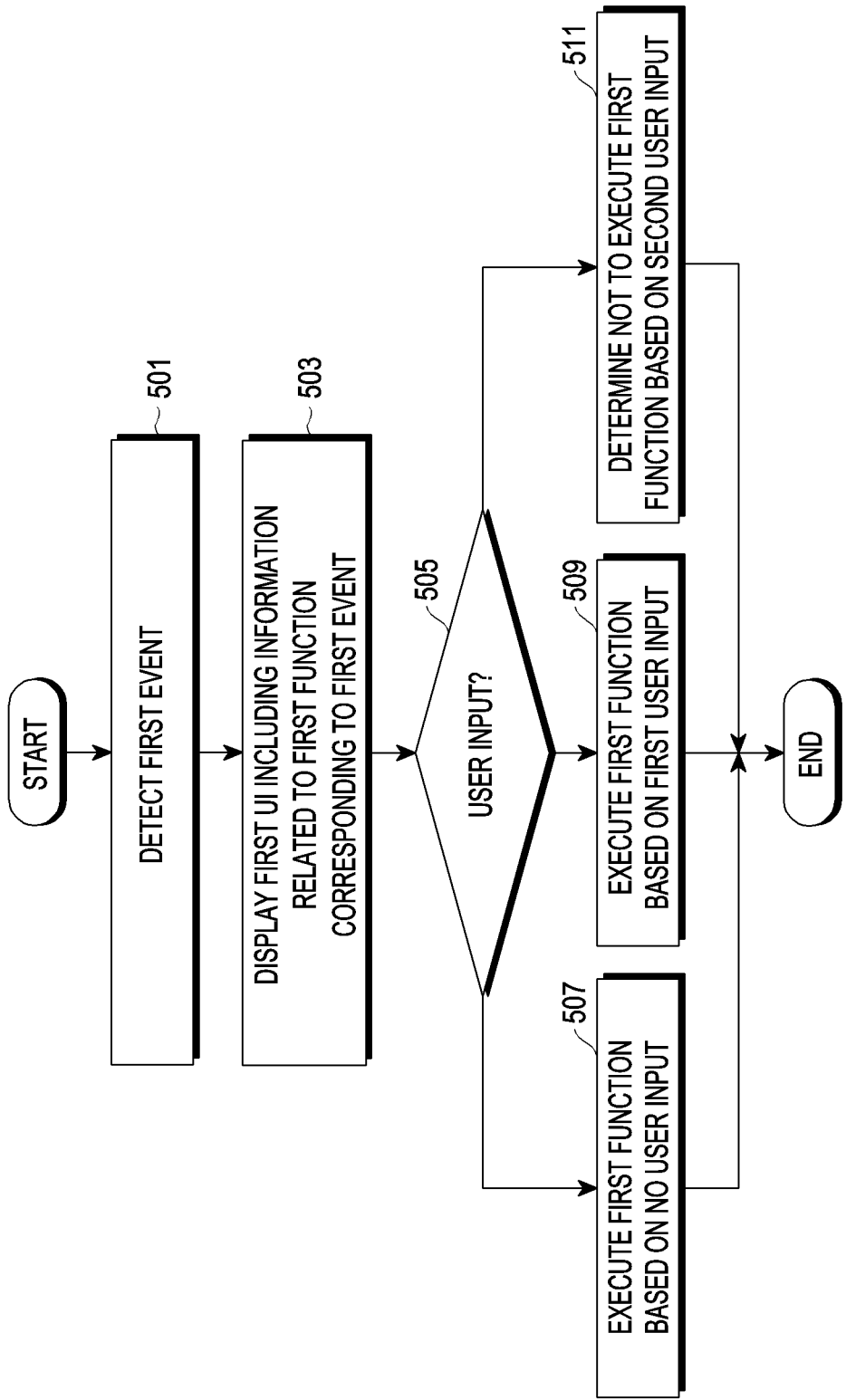
FIG. 5 is a flowchart illustrating an operation of an electronic device according to an embodiment of the disclosure.
Figure 6:
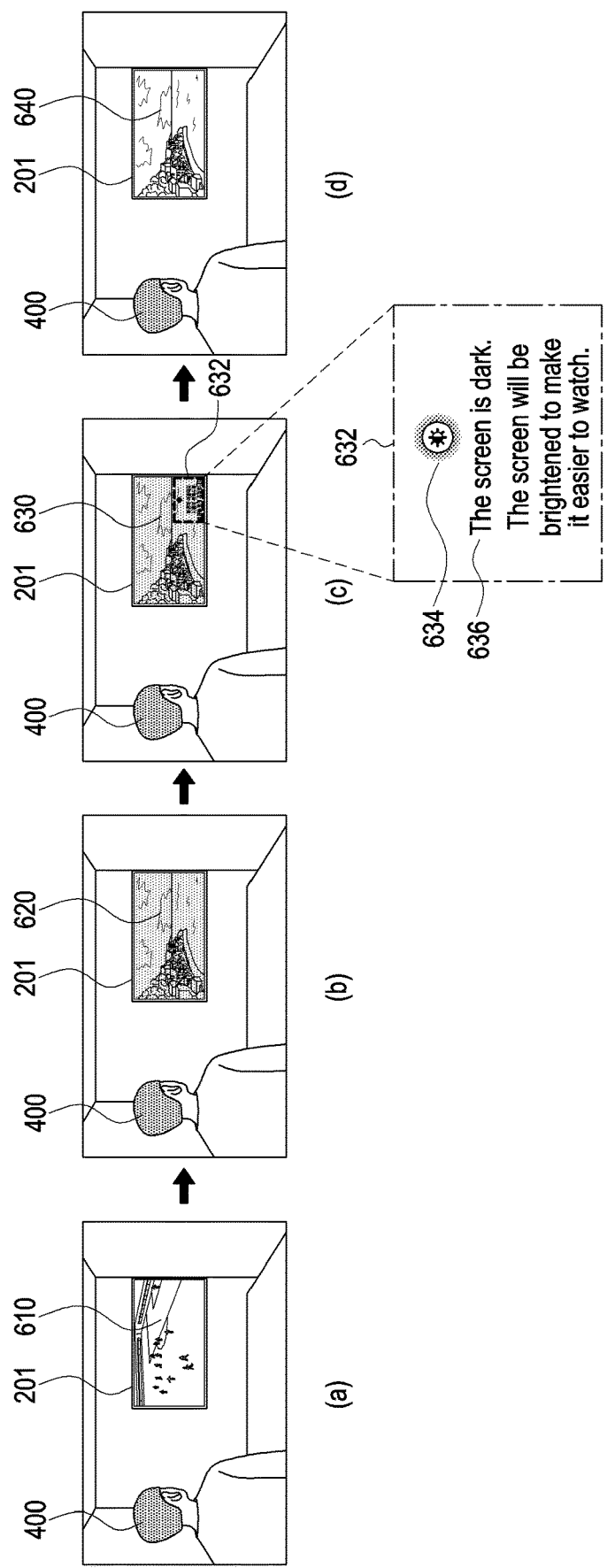
FIG. 6 is a diagram illustrating an operation of an electronic device according to an embodiment of the disclosure.
Figure 7:
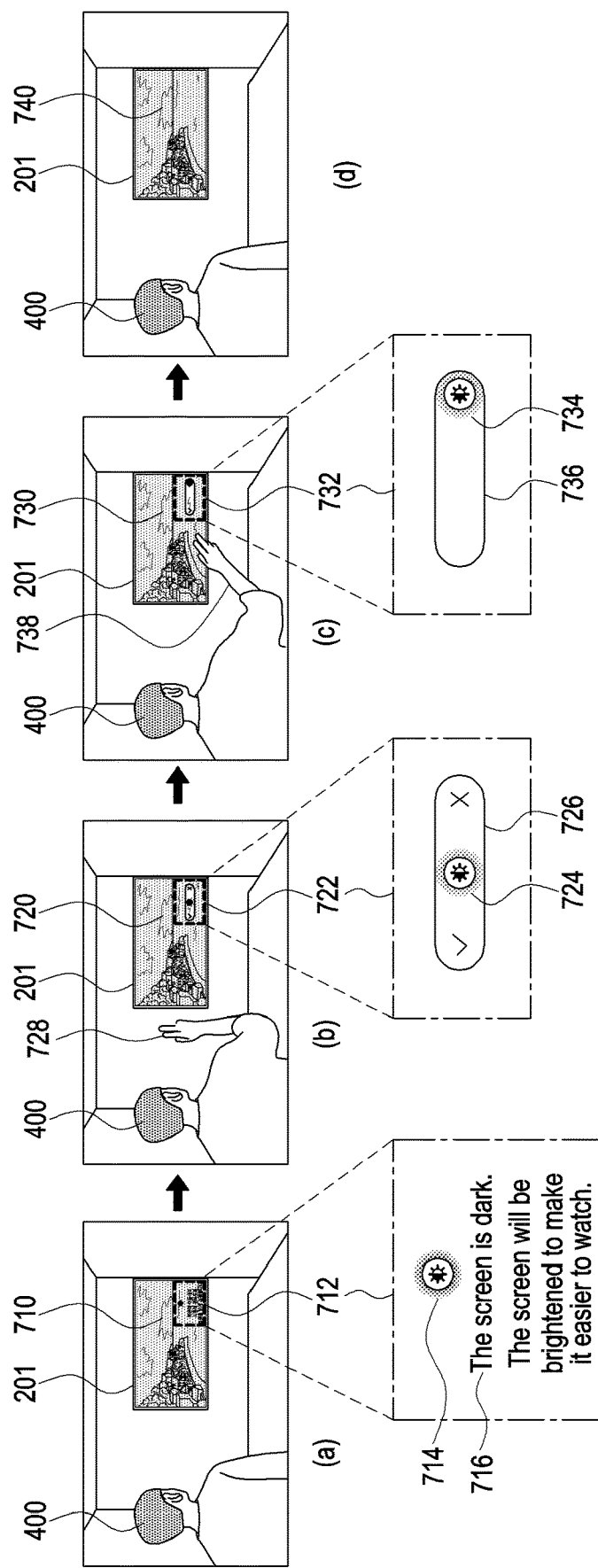
FIG. 7 is a diagram illustrating an operation of an electronic device according to an embodiment of the disclosure.

FIG. 5 is a flowchart illustrating an operation of an electronic device according to an embodiment of the disclosure. FIG. 5 will be described with reference to FIGS. 6 and 7. FIG. 6 is a diagram illustrating an operation of an electronic device according to an embodiment of the disclosure. FIG. 7 is a diagram illustrating an operation of an electronic device according to an embodiment of the disclosure.

The execution or non-execution of a function according to user intervention during "automatic function execution" in the electronic device 201 may be understood through FIG. 5.

Referring to FIG. 5, in operation 501, the electronic device 201 (e.g., the processor 220 of the electronic device 201) according to various embodiments may detect a first event. For example, the electronic device 201 may detect an event indicating that a screen is dark while displaying the screen on the display module 260. For example, in FIG. 6, the electronic device 201 may play video content on the display module 260. In part (a) of FIG. 6, the electronic device 201 may continue to display a first screen 610 without any screen adjustment, based on the brightness of the first screen 610 of the video content played on the display module 260 falling within a normal range. In part (b) of FIG. 6, the electronic device 201 may then identify that as the video content is played, a second screen 420 displayed on the display module 260 is dark.

In operation 503, the electronic device 201 according to various embodiments may display a first UI (e.g., 632 in FIG. 6 or 712 in FIG. 7) including information related to a first function corresponding to the detected first event on at least a portion of the screen (e.g., 620 in FIG. 6 or 710 in FIG. 7). For example, the electronic device 201 may display a UI including information related to screen brightness adjustment (e.g., an icon or text indicating that the screen brightness adjustment will be executed) on at least a portion of the screen (e.g., 620 in FIG. 6 or 710 in FIG. 7) based on detecting the event indicating that the screen is dark. For example, in part (c) of FIG. 6 or part (a) of FIG. 7, the electronic device 201 may display the UI (e.g., 632, or 712) indicating that the screen brightness will be adjusted to be higher because the currently playing screen is dark, on at least a portion of the screen (e.g., 630, or 710). For example, the UI (e.g., 632 or 712) may include an icon (e.g., 634 or 714) and/or text (e.g., 636 or 716) indicating screen brightness adjustment (e.g., "The screen is dark. The screen will be brightened to make it easier to watch."). For example, the first UI (e.g., 632 in FIG. 6 or 712 in FIG. 7) may be an announcement UI. An announcement UI may be a UI indicating that a specific function will be performed or has been performed. A questioning UI described later may be a UL for determining whether to execute a specific function or how to execute a specific function.

In operation 505, the electronic device 201 according to various embodiments may identify a user input. For example, the electronic device 201 may identify whether a specified user input (e.g., a gaze input, a gesture input, or a voice input) has been detected. For example, the electronic device 201 may perform operation 507 based on non-detection of the specified user input (e.g., part (d) of FIG. 6). For example, the electronic device 201 may perform operation 509 or operation 511 based on detection of the specified user input (e.g., part (b) of FIG. 7).

In operation 507, the electronic device 201 according to various embodiments may execute a function (e.g., a first function) corresponding to the detected event (e.g., the first event) based on the non-detection of the specified user input (e.g., a gaze input, a gesture input, or a voice input). For example, referring to part (c) of FIG. 6 and part (d) of FIG. 6, the electronic device 201 may execute the function (e.g., a screen brightness adjustment function) based on the non-detection of the specified user input after displaying the first UI (e.g., 632 in FIG. 6) that includes the information related to the function (e.g., the screen brightness adjustment function) corresponding to the detected event (e.g., the event indicating that the screen is dark) on at least a portion of the screen (e.g., 620 in FIG. 6). For example, the electronic device 201 may display a screen (e.g., 640 in FIG. 6) with an adjusted screen brightness.

In operation 505 described above, after displaying the first UI (e.g., 712 in FIG. 7), the electronic device 201 according to various embodiments may display a second UI (e.g., 722 in FIG. 7) for determining whether to execute the function (or how to execute the function) based on the detection of the specified user input (e.g., a gaze input, a gesture input, or a voice input) on at least a portion of the screen (e.g., 720 of 730, or 740 FIG. 7). For example, referring to part (b) of FIG. 7, the electronic device 201 may display the second UI 722 on at least a portion of the screen 720 based on a user's specified gesture input 728 (e.g., a hand raising gesture). For example, the second UI 722 may include a specified icon 724 or 734 (e.g., a sun-shaped icon) representing a specified function (e.g., the screen brightness adjustment function). For example, the icon 724 included in the second UI 722 may correspond to the icon 714 included in the first UI 712. Alternatively, the icon 724 included in the second UI 722 may be an icon obtained by partially changing the shape of the icon 714 included in the first UI 712, and the shape of the icon 724 or the icon 714 is not limited. For example, the second UI 722 may be displayed on the screen in place of the first UI 712 or may be displayed on the screen, including at least a portion (e.g., the specified icon 714 representing the specified function) of the first UI 712. For example, the second UI 722 may be a UI for determining whether to execute a function (or how to execute the function). For example, referring to part (b) of FIG. 7, the second UI 722 may include an object 726 or 736 for selecting whether to agree to execute the function (e.g., the screen brightness adjustment function). For example, the second UI 722 may include an object (e.g., an OK button of the object 726) indicating consent to the execution of the function in a first direction (e.g., a left direction) of the icon 724 and an object (e.g., a decline button of the object 726) indicating rejection to the execution of the function in a second direction (e.g., a right direction) of the icon 724. Although not shown, the second UI (e.g., 722) may also include an object for selecting how to execute the function (e.g., whether to dim or brighten the screen), and the form of the second UI (e.g., 722) is not limited.

In operation 509, after displaying the second UI (e.g., 722 in FIG. 7), the electronic device 201 according to various embodiments may execute the specified function (e.g., the first function) based on the detection of the specified first user input (e.g., a gaze input, a gesture input, or a voice input). For example, in part (b) of FIG. 7, after displaying the second UI 722 based on the detection of the specified user input (e.g., a gesture input of raising a hand), the electronic device 201 may execute the specified function (e.g., the first function) (e.g., the screen brightness adjustment function) based on detection of a first user input (e.g., a gesture input of moving a hand in a direction (e.g., the left direction) in which the object indicating consent (e.g., the object corresponding to the OK button, located on the left side of the object 726) is displayed.

In operation 511, the electronic device 201 according to various embodiments may determine not to execute the specified function (e.g., the first function) based on detection of a specified second user input (e.g., a gaze input, a gesture input, or a voice input) after displaying the second UI (e.g., 722 in FIG. 7). For example, after the electronic device 201 displays the second UI 722 based on the specified user input (e.g., a gesture input of raising a hand) in part (b) of FIG. 7, it may determine that the specified function (e.g., the first function) (e.g., the screen brightness adjustment function) is not to be executed based on detection of a second user input 738 (e.g., a gesture input of moving a hand in the direction (e.g., to the right) in which the object indicating rejection (e.g., the object corresponding to the decline button, located on the right side of the object 726)) in part (c) of FIG. 7.

Although a gesture input has been described with reference to FIG. 7 by way of example, the user input is not limited to a gesture input. For example, the electronic device 201 may display the second UI (e.g., 722) based on the user's voice input or a user input via a remote control, and determine to execute or not to execute the specified function based on the user's voice input or the user input via the remote control.

Figure 8:
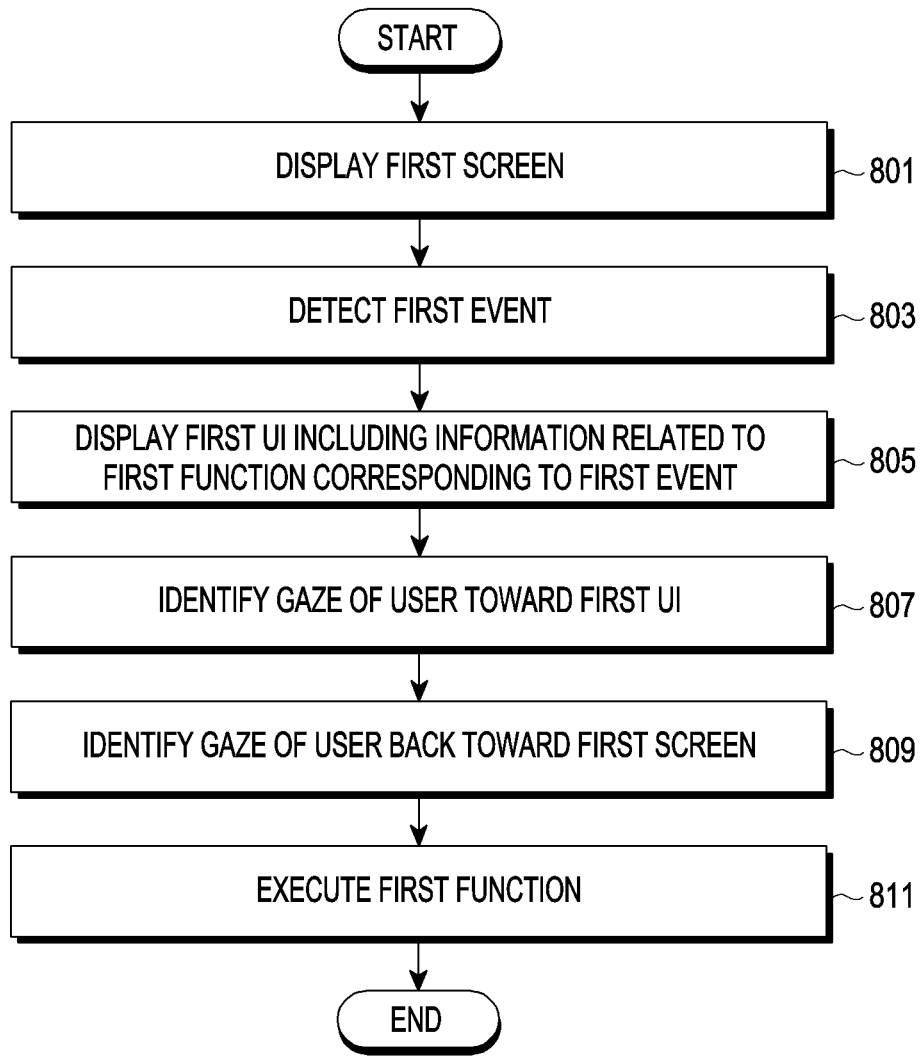
FIG. 8 is a flowchart illustrating an operation of an electronic device according to an embodiment of the disclosure.
Figure 9:
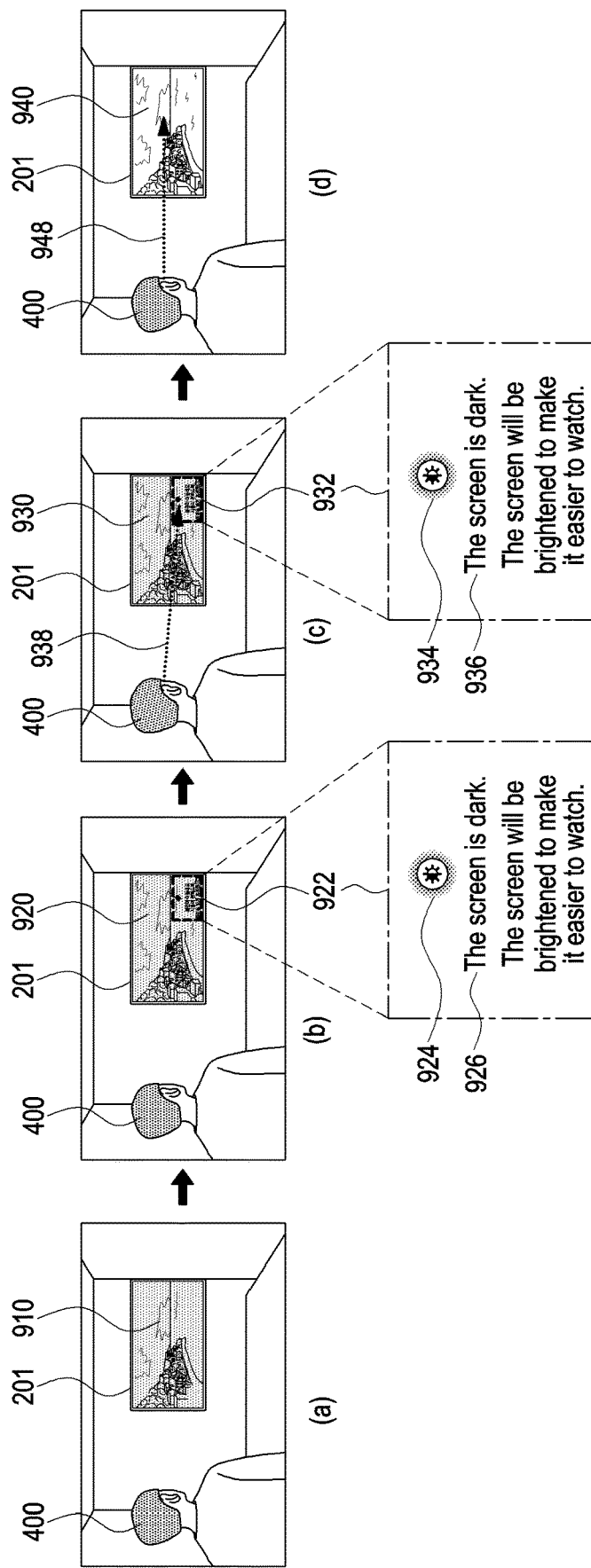
FIG. 9 is a diagram illustrating an operation of an electronic device according to an embodiment of the disclosure.

FIG. 8 is a flowchart illustrating an operation of an electronic device according to an embodiment of the disclosure. FIG. 8 will be described with reference to FIG. 9. FIG. 9 is a diagram illustrating an operation of an electronic device according to an embodiment of the disclosure.

Referring to FIG. 8, the electronic device 201 (e.g., the processor 220 of the electronic device 201) according to various embodiments may display a screen (e.g., a first screen 910 in FIG. 9) in operation 801.

In operation 803, the electronic device 201 according to various embodiments may detect a first event. For example, the electronic device 201 may detect the first event while displaying the screen (e.g., the screen 910 in FIG. 9) on the display module 260. For example, the electronic device 201 may detect an event indicating that the screen (e.g., the screen 910 of FIG. 9) is dark.

In operation 805, the electronic device 201 according to various embodiments may display a first UI (e.g., 922 in FIG. 9) including information related to a first function (e.g., the screen brightness adjustment function) corresponding to the first event on at least a portion of the screen (e.g., 920 in FIG. 9) based on the detection of the first event. Referring to FIG. 9, the first UI 922 may include a specified icon 924 or 934 corresponding to the first function and/or specified text 926 or 936 indicating the first function (e.g., "The screen is dark. The screen will be brightened to make it easier to watch.").

In operation 807, the electronic device 201 according to various embodiments may identify a gaze (e.g., 938 in FIG.

9) of the user 400 toward the first UI (e.g., 932 in FIG. 9). For example, the electronic device 201 may identify the direction of the gaze 938 of the user 400 of the electronic device 201, while displaying the first UI (e.g., 932 in FIG. 9). For example, the electronic device 201 may identify that the direction of the gaze of the user 400 corresponds to a location where the first UI 932 is displayed.

In operation 809, the electronic device 201 according to various embodiments may identify the gaze of the user 400 back toward the screen (e.g., 930 or 940 in FIG. 9). For example, the electronic device 201 may identify that the user 400 views the first UI and then views the screen 930 or 940 again by identifying the direction of the gaze (e.g., 938 or 948) of the user 400.

In operation 811, the electronic device 201 may according to various embodiments may execute the first function (e.g., the screen brightness adjustment function) based on the user 400 viewing the first UI 932 and then viewing the screen 930 or 940 again. For example, based on the user viewing the UI (e.g., 922 or 932) related to the specified function, and then viewing the screen (e.g., 930 or 940) again without a further user input, the electronic device 201 may execute the specified function, considering that the user has implicitly consented to the execution of the specified function.

Figure 10:
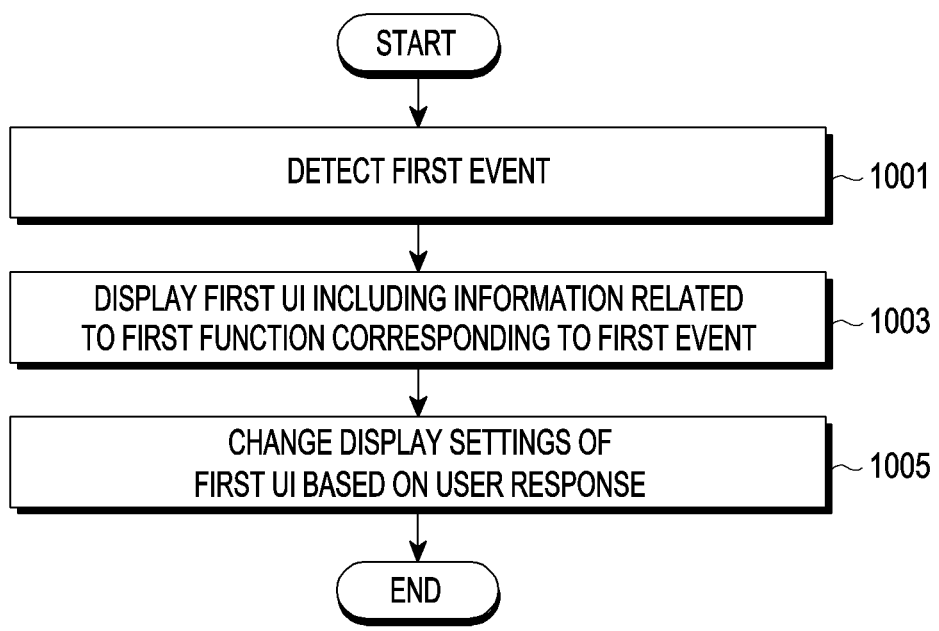
FIG. 10 is a flowchart illustrating an operation of an electronic device according to an embodiment of the disclosure.
Figure 11:
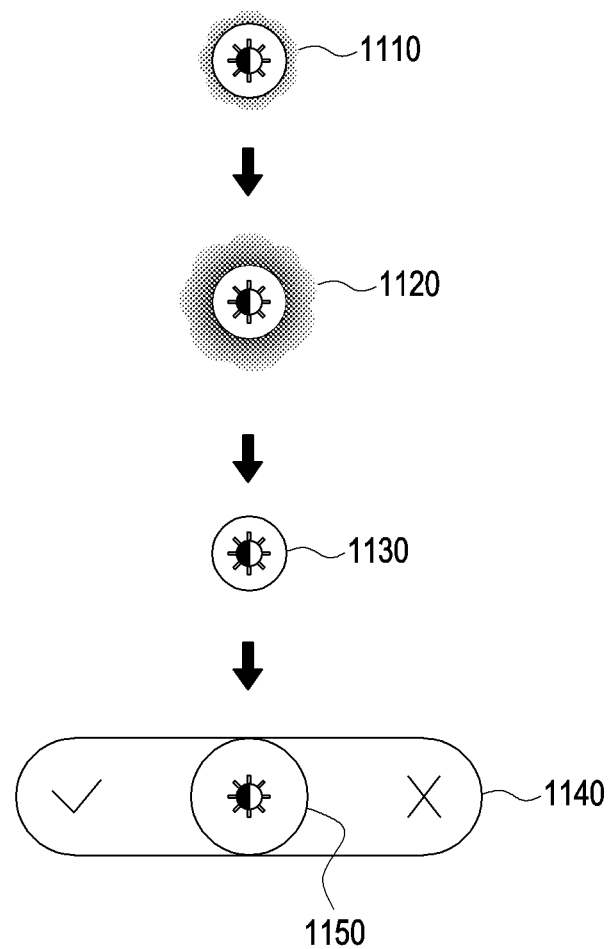
FIG. 11 is a diagram illustrating an operation of an electronic device according to an embodiment of the disclosure.

FIG. 10 is a flowchart illustrating an operation of an electronic device according to an embodiment of the disclosure. FIG. 10 will be described with reference to FIG. 11. FIG. 11 is a diagram illustrating an operation of an electronic device according to an embodiment of the disclosure.

Referring to FIG. 10, in operation 1001, the electronic device 201 (e.g., the processor 220 of the electronic device 201) according to various embodiments may detect a first event. For example, the electronic device 201 may detect an event indicating that a screen displayed on the display module 260 is dark.

In operation 1003, the electronic device 201 according to various embodiments may display a first UI (e.g., 1110 in FIG. 11) including information related to a first function (e.g., the screen brightness adjustment function) corresponding to the detected first event (e.g., the event indicating that the displayed screen is dark) on at least a portion of the screen. For ease of description, 1110 may indicate a UI 1110 or an icon 1110. For example, when 1110 indicates a UI, the UI 1110 may be described as including a specified icon (e.g., a sun-shaped icon). Alternatively, when 1110 indicates an icon, the specified icon 1110 (e.g., a sun-shaped icon) may be described as being included in a UI.

In operation 1005, the electronic device 201 according to various embodiments may change display settings of the first UI (e.g., 1110 in FIG. 11) based on a user response. The display settings of the first UI (e.g., 1110 in FIG. 11) may include the color, size, rotation speed, rotation direction, and/or rotation method of an animation (or motion effect) (e.g., a cloud-like translucent object that rotates around the icon 1110) formed around the icon 1110. For example, the icon 1110 may be an icon with a smaller representation of the animation, an icon 1120 may be an icon with a larger representation of the animation, and an icon 1130 may be an icon with no animation in FIG. 11.

For example, the electronic device 201 may change the display settings of the first UI (e.g., 1110 in FIG. 11) based on the direction of a gaze of the user.

For example, the electronic device 201 may display a first UI (e.g., 1120 in FIG. 11) with changed display settings based on the user not viewing the first UI (e.g., 1110 in FIG. 11) after the first UI (e.g., 1110 in FIG. 11) is displayed. For example, the electronic device 201 may determine the color, animation size, rotation speed, rotation direction, and/or rotation method of the first UI (e.g., 1110 of FIG. 11) based on a time duration during which the user does not view the first UI (e.g., 1110 in FIG. 11). For example, as the user does not view the first UI (e.g., 1110 in FIG. 1) longer, the electronic device 201 may increase the size (or rotation speed) of the animation of the first UI (e.g., 1110 in FIG. 11), or change the color of the animation (or icon) to a specified color over time.

For example, the electronic device 201 may display a first UI (e.g., 1130 in FIG. 11) with the changed display settings based on the user viewing the first UI (e.g., 1110 in FIG. 11) after the first UI (e.g., 1110 in FIG. 11) is displayed. For example, the electronic device 201 may display a first UI (e.g., 1130 in FIG. 11) that does not include an animation and includes only the icon 1130, based on the user viewing the first UI (e.g., 1110 in FIG. 11).

For example, in FIG. 11, the electronic device 201 may display a second UI 1140 based on a user response. For example, the electronic device 201 may display the second UI 1140 based on the user continuing to view the first UI (e.g., 1110, 1120, or 1130). For example, the electronic device 201 may display the second UI 1140 based on the holding duration of a gaze of the user toward the first UI (e.g., 1110, 1120, or 1130) exceeding a threshold. For example, the second UI 1140 may be a questioning UI. For example, the second UI 1140 may include a specified icon 1150 (e.g., an icon corresponding to 1110, 1120, or 1130) representing a specified function, and an object for selecting whether to execute the function (or how to execute the function) (e.g., an object corresponding to an OK button or a decline button). For example, the second UI 1140 may be displayed on the screen in place of the first UI 1110, 1120, or 1130, or may include at least a portion (e.g., the specified icon 1150 representing the specified function) of the first UI 1110, 1120, or 1130.

Figure 12A:
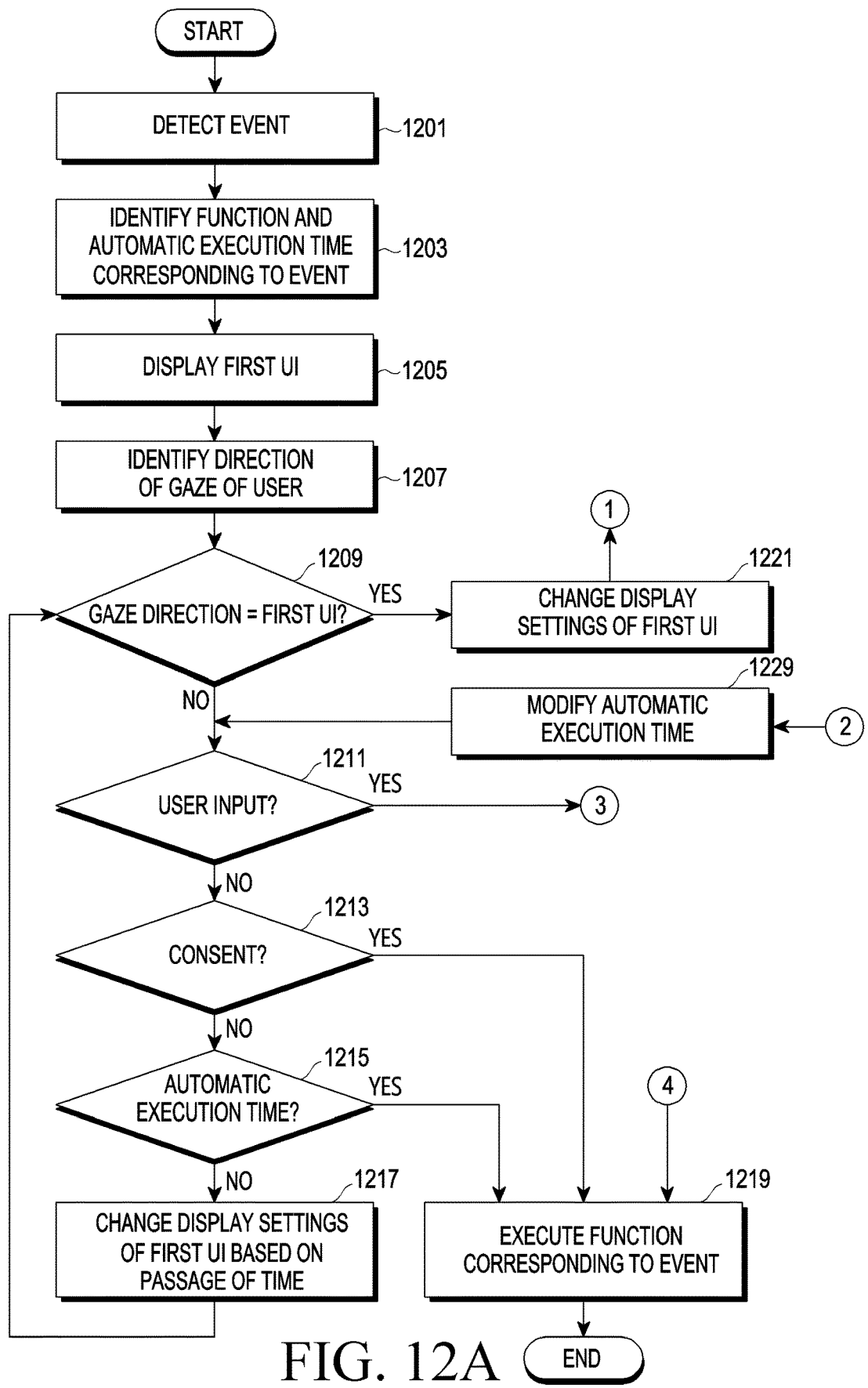
FIG. 12A is a flowchart illustrating an operation of an electronic device according to an embodiment of the disclosure.
Figure 12B:
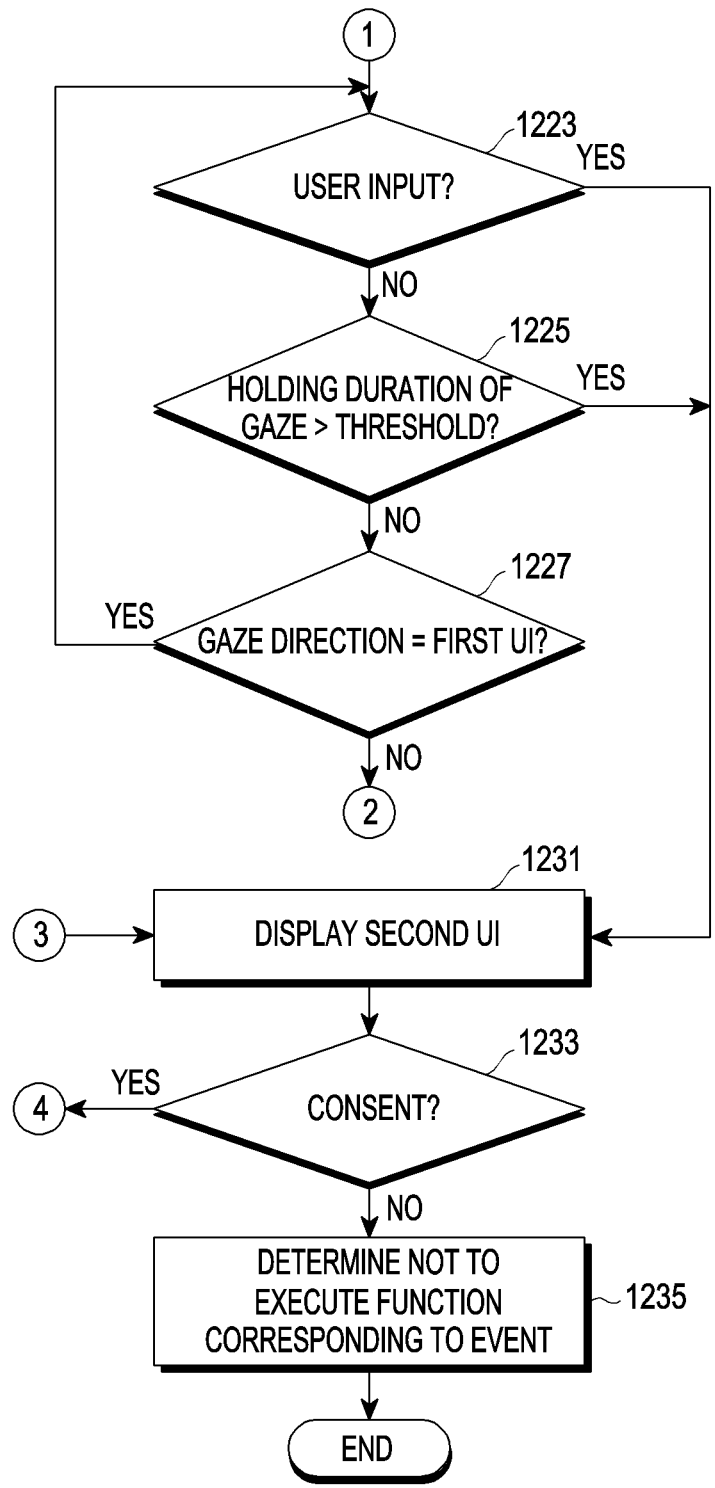
FIG. 12B is a flowchart illustrating an operation of an electronic device according to an embodiment of the disclosure.

FIG. 12A is a flowchart illustrating an operation of an electronic device according to an embodiment of the disclosure. FIG. 12B is a flowchart illustrating an operation of an electronic device according to an embodiment of the disclosure. FIGS. 12A and 12B depict one flowchart divided into two drawings and accordingly, will be described in connection with each other.

Referring to FIGS. 12A and 12B, in operation 1201, the electronic device 201 (e.g., the processor 220 of the electronic device 201) according to various embodiments may detect an event (e.g., an event indicating that a screen is dark). The operation of detecting an event by the electronic device 201 has been described before.

In operation 1203, the electronic device 201 according to various embodiments may identify a function (e.g., the screen brightness adjustment function) and an automatic execution time corresponding to the detected event (e.g., the event indicating that the screen is dark). The automatic execution time may be a time at which the function corresponding to the detected event is to be executed. For example, when the electronic device 201 detects the event indicating that the screen is dark and determines that the automatic execution time of the screen brightness adjustment function is 5 seconds, the electronic device 201 may execute the screen brightness adjustment function after 5 seconds. For example, the electronic device 201 may determine the automatic execution time of the specified function based on default settings. For example, the electronic device 201 may set the automatic execution time based on the past usage history of the user related to the function (e.g., the screen brightness adjustment function) corresponding to the detected event (e.g., the event indicating that the screen is dark). For example, the electronic device 201 may set the automatic execution time of the function based on a past history of user consent to automatic execution of the function or a past history of not cancelling automatic execution of the function in relation to the specific function.

In operation 1205, the electronic device 201 may display a first UI according to various embodiments. For example, the electronic device 201 may display the first UI (e.g., an announcement UI (e.g., 632 in FIG. 6, 712 in FIG. 7, 922 or 932 in FIG. 9, or 1110, 1120, or 1130 in FIG. 11)) indicating that the function (e.g., the screen brightness adjustment function) corresponding to the detected event (e.g., the event indicating that the screen is dark) is to be executed.

In operation 1207, the electronic device 201 according to various embodiments may identify the direction of a gaze of the user. For example, the electronic device 201 may identify an area (e.g., an area where the first UI is displayed or an area where the first UI is not displayed) of a screen of the electronic device 201 that the user is viewing.

The electronic device 201 according to various embodiments may perform operation 1221 based on the direction of the gaze of the user corresponding to the area in which the first UI (e.g., an announcement UI (e.g., 632 in FIG. 6, 712 in FIG. 7, 922 or 932 in FIG. 9, or 1110, 1120, or 1130 in FIG. 11)) is displayed in operation 1209. Alternatively, the electronic device 201 may perform operation 1211 based on the direction of the gaze of the user corresponding to the area where the first UI is not displayed.

The electronic device 201 according to various embodiments may perform operation 1231 based on detecting a specified user input (e.g., a gesture input or a voice input) (e.g., a gesture input of raising a hand or a voice input of requesting consent) in operation 1211. Alternatively, the electronic device 201 may perform operation 1213 based on the specified user input (e.g., a gesture input or a voice input) (e.g., a gesture input of raising a hand or a voice input of requesting consent) not being detected.

The electronic device 201 according to various embodiments may perform operation 1219 based on identifying a user input indicating consent (e.g., a gesture input indicating consent or a voice input indicating consent) after the first UI (e.g., an announcement UI (e.g., 632 in FIG. 6, 712 in FIG. 7, 922 or 932 in FIG. 9, or 1110, 1120, or 1130 in FIG. 11)) is displayed in operation 1213. Alternatively, the electronic device 201 may perform operation 1215 based on failing to identify the user input indicating consent (e.g., the gesture input indicating consent or the voice input indicating consent). Although not shown, the electronic device 201 may perform operation 1235 based on identifying a user input indicating rejection (e.g., a gesture input indicating rejection or a voice input indicating rejection) in operation 1213.

The electronic device 201 according to various embodiments may perform operation 1219 based on reaching the automatic execution time (e.g., the automatic execution time identified in operation 1203 or modified (or shortened) in operation 1229 described later) in operation 1215. Alternatively, the electronic device 201 may perform operation 1217 based on not reaching the automatic execution time.

In operation 1217, the electronic device 201 according to various embodiments may change the display settings of the first UI based on the passage of time. For example, the electronic device 201 may change the display settings of the first UI according to the passage of time. For example, the electronic device 201 may determine the color, animation size, rotation speed, rotation direction, and/or rotation method of the first UI (e.g., 1110 in FIG. 11) based on a time duration during which the user does not view the first UI (e.g., 1110 in FIG. 11). For example, as the user does not view the first UI (e.g., 1110 in FIG. 11) longer, the electronic device 201 may increase the size (or rotation speed) of the animation of the first UI (e.g., 1110 in FIG. 11), or change the color of the animation (or icon) to a specified color over time.

In operation 1219, the electronic device 201 according to various embodiments may execute the function (e.g., the screen brightness adjustment function) corresponding to the detected event (e.g., the event indicating that the screen is dark), based on identifying the user input consenting to the execution of the specified function (e.g., "yes" in operation 1213 or "yes" in operation 1233 described later), or based on reaching the automatic execution time (e.g., "yes" in operation 1215).

In operation 1221, the electronic device 201 according to various embodiments may display a first UI (e.g., 1130 in FIG. 11) with changed display settings based on the direction of the gaze of the user corresponding to the area in which the first UI (e.g., 632 in FIG. 6, 712 in FIG. 7, 922 or 932 in FIG. 9, or 1110 or 1120 in FIG. 11) is displayed (e.g., "yes" in operation 1209). For example, the electronic device 201 may display a first UI (e.g., 1130 in FIG. 11) that does not include an animation, but only an icon (e.g., 1130 in FIG. 11), based on the user viewing the first UI (e.g., 1110 or 1120 in FIG. 11).

The electronic device 201 according to various embodiments may perform operation 1231 based on detecting a specified user input (e.g., a gesture input or a voice input) (e.g., a gesture input of raising a hand or a voice input requesting consent) in operation 1223. Alternatively, the electronic device 201 may perform operation 1225 based on the specified user input (e.g., a gesture input or a voice input) (e.g., the gesture input of raising a hand or the voice input requesting consent) not being detected.

The electronic device 201 according to various embodiments may perform operation 1231 based on the holding duration of the gaze of the user toward the first UI (e.g., 1110, 1120, or 1130 in FIG. 11) exceeding a threshold in operation 1225. Alternatively, the electronic device 201 may perform operation 1227 based on the holding duration of the gaze of the user toward the first UI (e.g., 1110, 1120, or 1130 in FIG. 11) being equal to or less than the threshold.

The electronic device 201 according to various embodiments may perform operation 1223 based on the direction of the gaze of the user corresponding to the area in which the first UI (e.g., an announcement UI (e.g., 632 in FIG. 6, 712 in FIG. 7, 922 or 932 in FIG. 9, or 1130 in FIG. 11)) is displayed in operation 1227. Alternatively, the electronic device 201 may perform operation 1229 based on the direction of the gaze of the user corresponding to an area where the first UI is not displayed.

In operation 1229, the electronic device 201 according to various embodiments may modify the automatic execution time of the specified function based on the direction of the gaze of the user corresponding to a location where the first UI is displayed at a first time point after detecting the event and the direction of the gaze of the user not corresponding to the location where the first UI is displayed at a second time point after the first time point. For example, the modification of the automatic execution time may be shortening the automatic execution time or immediately executing the specified function. For example, the electronic device 201 may execute the specified function, considering that the user has implicitly consented to the execution of the specified function, based on the user viewing the first UI (e.g., an announcement UI (e.g., 922 or 932 in FIG. 9)) related to the specified function, and then viewing the screen (e.g., 930 or 940) again without a further user input. For example, the electronic device 201 may perform operation 1211 based on shortening the automatic execution time. Shortening the automatic execution time means setting the specified function to be executed at a time earlier than the automatic execution time identified in operation 1203.

In operation 1231, the electronic device 201 according to various embodiments may display the second UI based on detecting the specified user input (e.g., "yes" in operation 1211 or "yes" in operation 1223) or based on the holding duration of the gaze of the user toward the first UI (e.g., 1110, 1120, or 1130 in FIG. 11) exceeding the threshold, after displaying the first UI (e.g., 1110, 1120, or 1130 in FIG. 11). For example, the electronic device 201 may display the second UI (e.g., a questioning UI (e.g., 722 or 732 in FIG. 7 or 1140 in FIG. 11)) for selecting whether (or how) to execute the function (e.g., the screen brightness adjustment function) corresponding to the detected event (e.g., the event indicating that the screen is dark).

The electronic device 201 according to various embodiments may perform operation 1219 based on identifying the user input indicating consent (e.g., the gesture input indicating consent or the voice input indicating consent) after displaying the second UI (e.g., a questioning UI (e.g., 722 or 732 in FIG. 7 or 1140 in FIG. 11)) in operation 1233. Alternatively, the electronic device 201 may perform operation 1235 based on identifying the user input indicating rejection (e.g., the gesture input indicating rejection or the voice input indicating rejection) in operation 1233. Alternatively, the electronic device 201 may perform operation 1235 based on a specified time elapsing without identifying the user input indicating consent (e.g., the gesture input indicating consent or the voice input indicating consent) in operation 1233.

In operation 1235, the electronic device 201 according to various embodiments may determine not to execute the function (e.g., the screen brightness adjustment function) corresponding to the detected event (e.g., the event indicating that the screen is dark).

Figure 13:
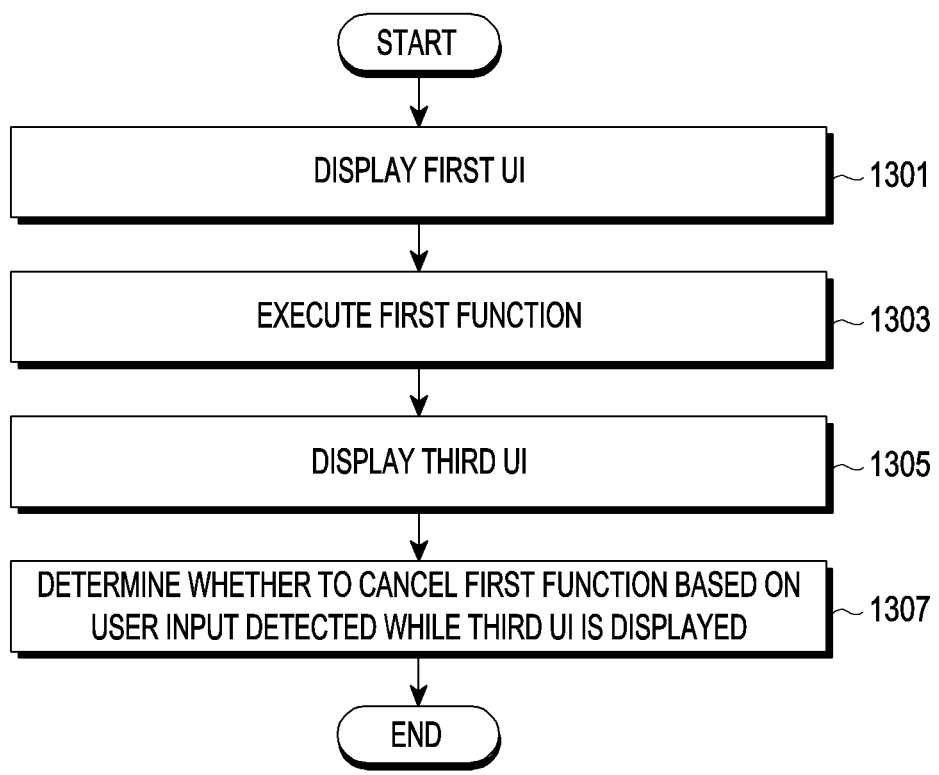
FIG. 13 is a flowchart illustrating an operation of an electronic device according to an embodiment of the disclosure.
Figure 14:
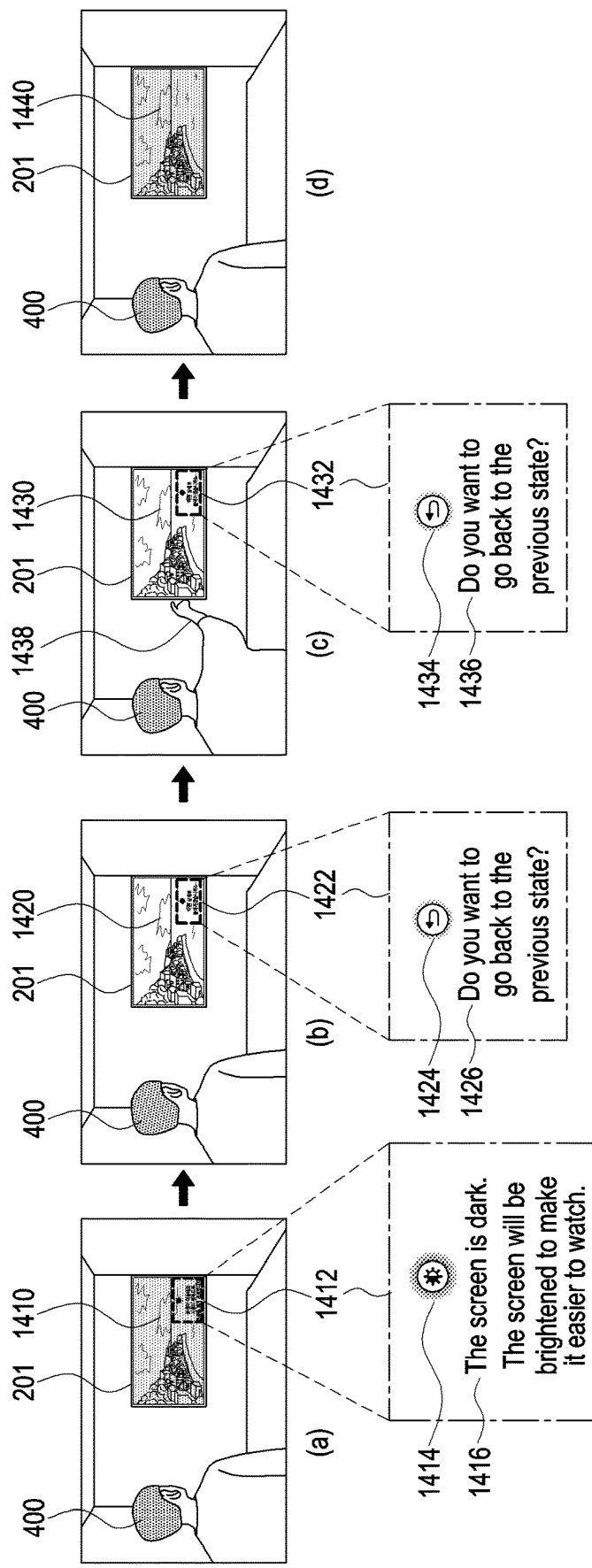
FIG. 14 is a diagram illustrating an operation of an electronic device according to an embodiment of the disclosure.

FIG. 13 is a flowchart illustrating an operation of an electronic device according to an embodiment of the disclosure. FIG. 13 will be described with reference to FIG. 14. FIG. 14 is a diagram illustrating an operation of an electronic device according to an embodiment of the disclosure.

Referring to FIG. 13, in operation 1301, the electronic device 201 (e.g., the processor 220 of the electronic device 201) according to various embodiments may display a first UI. For example, the electronic device 201 may display a first UI (e.g., 1412 in FIG. 14) indicating that a function (e.g., the screen brightness adjustment function) corresponding to a detected event (e.g., an event indicating that a screen is dark) is to be executed, on at least a portion of a screen 1410, 1420, 1430, or 1440. For example, the first UI 1412 may include a specified icon 1414 and/or specified text 1416 (e.g., "The screen is dark. The screen will be brightened to make it easier to view.").

In operation 1303, the electronic device 201 according to various embodiments may execute the function (e.g., the screen brightness adjustment function) corresponding to the detected event (e.g., the event indicating that the screen is dark). The execution of the function has been described before with reference to FIGS. 12A and 12B.

In operation 1305, the electronic device 201 according to various embodiments may display a third UI (e.g., 1422 or 1432 in FIG. 14). For example, the third UI may be a UI for cancelling the execution of the function (e.g., undoing the function). For example, referring to FIG. 14, the third UI 1422 or 1432 may include an icon 1424 or 1434 indicating cancellation of the execution of the function and/or text 1426 or 1436 indicating cancellation of the execution of the function (e.g., "Do you want to go back to the previous state?").

In operation 1307, the electronic device 201 according to various embodiments may determine whether to cancel the executed function (e.g., the first function) based on a user input (e.g., a gesture input or voice input consenting to cancellation of the execution, or a gesture input or voice input rejecting the cancellation of the execution) detected while the third UI (e.g., 1422 or 1432 in FIG. 14) is displayed. For example, in part (c) of FIG. 14, the electronic device 201 may cancel (undo) the execution of the first function (e.g., the screen brightness adjustment function) based on a gesture input 1438 of pointing to the third UI 1432 for canceling (e.g., undoing) the execution of the function from the user 400 (1440).

It will be understood by those skilled in the art that the various embodiments described herein may be applied in close conjunction with each other within an applicable range. For example, those skilled in the art will understand that at least some of the operations of an embodiment described herein may be omitted, and at least some of the operations of one embodiment may be applied in close conjunction with at least some of the operations of another embodiment.

According to various embodiments of the disclosure, the electronic device 201 may include the display module 260 and the processor 220. The processor may be configured to detect a first event, while a first screen is displayed through the display module, display a first UI including information related to a first function corresponding to the first event on at least a portion of the first screen through the display module, based on the detection of the first event, identify a direction of a gaze of a user of the electronic device, while the first UI is displayed, display a second UI, based at least in part on the direction of the gaze corresponding to a location where the first UI is displayed, and determine whether to execute the first function corresponding to the first event, based on a first user input detected while the second UI is displayed.

According to various embodiments of the disclosure, the processor may be configured to determine to execute the first function, based on detection of a first gesture input of the user or a first voice input of the user as the first user input, while the second UI is displayed.

According to various embodiments of the disclosure, the processor may be configured to change a display setting of the first UI, based on the direction of the gaze corresponding to the location where the first UI is displayed.

According to various embodiments of the disclosure, the display setting of the first UI may include a setting for a size, a speed, or a color of a motion effect related to the first UI.

According to various embodiments of the disclosure, the processor may be configured to display the second UI, based on the direction of the gaze of the user corresponding to the location where the first UI is displayed, and a holding duration of the gaze toward the first UI exceeding a first threshold.

According to various embodiments of the disclosure, the processor may be configured to display the second UI, based on the direction of the gaze corresponding to the location where the first UI is displayed, and detection of a second user input of the user.

According to various embodiments of the disclosure, the processor may be configured to set an automatic execution time of the first function, based on the detection of the first event, and execute the first function based on reaching the automatic execution time.

According to various embodiments of the disclosure, the processor may be configured to modify the automatic execution time of the first function, based on the direction of the gaze corresponding to the location where the first UI is displayed at a first time point after the detection of the first event, and the direction of the gaze not corresponding to the location where the first UI is displayed at a second time point after the first time point. The modification of the automatic execution time may be to shorten the automatic execution time or to immediately execute the first function.

According to various embodiments of the disclosure, the processor may be configured to set the automatic execution time based on a past usage history of the user.

According to various embodiments of the disclosure, the processor may be configured to change a display setting of the first UI according to a time elapsed since displaying the first UI, based on the direction of the gaze not corresponding to the location where the first UI is displayed.

According to various embodiments of the disclosure, the processor may be configured to display a third UI based on execution of the first function, and determine whether to cancel the first function, based on a user input detected while the third UI is displayed.

According to various embodiments of the disclosure, a method of operating the electronic device 201 may include detecting a first event, while a first screen is displayed through the display module 260 of the electronic device, displaying a first UI including information related to a first function corresponding to the first event on at least a portion of the first screen through the display module, based on the detection of the first event, identifying a direction of a gaze of a user of the electronic device, while the first UI is displayed, displaying a second UI, based at least in part on the direction of the gaze corresponding to a location where the first UI is displayed, and determining whether to execute the first function corresponding to the first event, based on a first user input detected while the second UI is displayed.

According to various embodiments of the disclosure, determining whether to execute the first function may include determining to execute the first function, based on detection of a first gesture input of the user or a first voice input of the user as the first user input, while the second UI is displayed.

According to various embodiments of the disclosure, the method may further include changing a display setting of the first UI, based on the direction of the gaze corresponding to the location where the first UI is displayed.

According to various embodiments of the disclosure, the display setting of the first UI may include a setting for a size, a speed, or a color of a motion effect related to the first UI.

According to various embodiments of the disclosure, displaying the second UI may include displaying the second UI, based on the direction of the gaze of the user corresponding to the location where the first UI is displayed, and a holding duration of the gaze toward the first UI exceeding a first threshold.

According to various embodiments of the disclosure, displaying the second UI may include displaying the second UI, based on the direction of the gaze corresponding to the location where the first UI is displayed, and detection of a second user input of the user.

According to various embodiments of the disclosure, the method may further include setting an automatic execution time of the first function, based on the detection of the first event, and executing the first function based on reaching the automatic execution time.

According to various embodiments of the disclosure, the method may further include modifying the automatic execution time of the first function, based on the direction of the gaze corresponding to the location where the first UI is displayed at a first time point after the detection of the first event, and the direction of the gaze not corresponding to the location where the first UI is displayed at a second time point after the first time point. The modification of the automatic execution time may be to shorten the automatic execution time or to immediately execute the first function.

According to various embodiments of the disclosure, setting the automatic execution time may include setting the automatic execution time based on a past usage history of the user.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. according to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case according to various embodiments of the disclosure, the integrated component may still perform one or more functions of each of the plurality of components in the same or similar manner as they are performed by a corresponding one of the plurality of components before the integration. according to various embodiments of the disclosure, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
memory storing one or more computer programs; and
one or more processors communicatively coupled to the display and the memory,
wherein the computer programs include computer-executable instructions that, when executed by the one or more processors, cause the electronic device to:
identify a state of a first screen displayed through the display,
detect a first event based on the identified state of the first screen,
display, based on the detection of the first event, a first user interface including information related to a first function corresponding to the first event on at least a portion of the first screen through the display,
identify a direction of a gaze of a user of the electronic device, while the first user interface is displayed,
display a second user interface, based at least in part on the direction of the gaze corresponding to a location where the first user interface is displayed, and
determine whether to execute the first function corresponding to the first event, based on a first user input detected while the second user interface is displayed.

2. The electronic device of claim 1, wherein the one or more computer programs further include computer-executable instructions that, when executed by the one or more processors, cause the electronic device to determine to execute the first function, based on detection of a first gesture input of the user or a first voice input of the user as the first user input, while the second user interface is displayed.

3. The electronic device of claim 1, wherein the one or more computer programs further include computer-executable instructions that, when executed by the one or more processors, cause the electronic device to change a display setting of the first user interface, based on the direction of the gaze corresponding to the location where the first user interface is displayed.

4. The electronic device of claim 3, wherein the display setting of the first user interface includes a setting for a size, a speed, or a color of a motion effect related to the first user interface.

5. The electronic device of claim 1, wherein the one or more computer programs further include computer-executable instructions that, when executed by the one or more processors, cause the electronic device to display the second user interface, based on:

the direction of the gaze of the user corresponding to the location where the first user interface is displayed; and a holding duration of the gaze toward the first user interface exceeding a first threshold.

6. The electronic device of claim 1, wherein the one or more computer programs further include computer-executable instructions that, when executed by the one or more processors, cause the electronic device to display the second user interface, based on:

the direction of the gaze corresponding to the location where the first user interface is displayed; and detection of a second user input of the user.

7. The electronic device of claim 1, wherein the one or more computer programs further include computer-executable instructions that, when executed by the one or more processors, cause the electronic device to:

set an automatic execution time of the first function, based on detection of the first event; and execute the first function based on reaching the automatic execution time.

8. The electronic device of claim 7, wherein the one or more computer programs further include computer-executable instructions that, when executed by the one or more processors, cause the electronic device to modify the automatic execution time of the first function, based on:

the direction of the gaze corresponding to the location where the first user interface is displayed at a first time point after detection of the first event, and the direction of the gaze not corresponding to the location where the first user interface is displayed at a second time point after the first time point, and wherein modification of the automatic execution time is to shorten the automatic execution time or to immediately execute the first function.

9. The electronic device of claim 7, wherein the automatic execution time is set based on a past usage history of the user.

10. The electronic device of claim 1, wherein the one or more computer programs further include computer-executable instructions that, when executed by the one or more processors, cause the electronic device to change a display setting of the first user interface according to a time elapsed since displaying the first user interface, based on the direction of the gaze not corresponding to the location where the first user interface is displayed.

11. The electronic device of claim 1, wherein the one or more computer programs further include computer-executable instructions that, when executed by the one or more processors, cause the electronic device to:

display a third user interface based on execution of the first function; and determine whether to cancel the first function, based on a user input detected while the third user interface is displayed.

12. The electronic device of claim 1, wherein the state of the first screen upon which the first event is based is a state in which a brightness of the first screen displayed through the display is outside of a specified brightness range.

13. A method of operating an electronic device, the method comprising:

identifying a state of a first screen displayed through a display;

detecting a first event based on the identified state of the first screen;

displaying, based on the detection of the first event, a first user interface including information related to a first function corresponding to the first event on at least a portion of the first screen through the display;

identifying a direction of a gaze of a user of the electronic device, while the first user interface is displayed;

displaying a second user interface, based at least in part on the direction of the gaze corresponding to a location where the first user interface is displayed; and determining whether to execute the first function corresponding to the first event, based on a first user input detected while the second user interface is displayed.

14. The method of claim 13, wherein the determining of whether to execute the first function comprises determining to execute the first function, based on detection of a first gesture input of the user or a first voice input of the user as the first user input, while the second user interface is displayed.

15. The method of claim 13, further comprising:

changing a display setting of the first user interface, based on the direction of the gaze corresponding to the location where the first user interface is displayed.

16. The method of claim 15, wherein the display setting of the first user interface includes a setting for a size, a speed, or a color of a motion effect related to the first user interface.

17. The method of claim 13, wherein the displaying of the second user interface comprises displaying the second user interface based on:

the direction of the gaze of the user corresponding to the location where the first user interface is displayed; and a holding duration of the gaze toward the first user interface exceeding a first threshold.

18. The method of claim 13, wherein the displaying of the second user interface comprises displaying the second user interface based on:

the direction of the gaze corresponding to the location where the first user interface is displayed; and detection of a second user input of the user.

19. The method of claim 13, further comprising:

setting an automatic execution time of the first function, based on detection of the first event; and executing the first function based on reaching the automatic execution time.

20. One or more non-transitory computer-readable storage media storing computer-executable instructions that, when executed by one or more processors of an electronic device, cause the electronic device to perform operations, the operations comprising:

identifying a state of a first screen displayed through a display;

detecting a first event based on the identified state of the first screen;

displaying, based on the detection of the first event, a first user interface including information related to a first function corresponding to the first event on at least a portion of the first screen through the display;

identifying a direction of a gaze of a user of the electronic device, while the first user interface is displayed;

displaying a second user interface, based at least in part on the direction of the gaze corresponding to a location where the first user interface is displayed; and determining whether to execute the first function corresponding to the first event, based on a first user input detected while the second user interface is displayed.

21. The one or more non-transitory computer-readable storage media of claim 20, the operations comprising:

determining to execute the first function, based on detection of a first gesture input of the user or a first voice input of the user as the first user input, while the second user interface is displayed.

* * * * *